(12) United States Patent
Kim et al.

(10) Patent No.: US 9,669,783 B2
(45) Date of Patent: Jun. 6, 2017

(54) VEHICLE AND VEHICLE REMOTE CONTROL SYSTEM INCLUDING THE SAME

(71) Applicant: HYUNDAI MOTOR COMPANY, Seoul (KR)

(72) Inventors: Sung Un Kim, Yongin-si (KR); Kyunghyun Kang, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/944,812

(22) Filed: Nov. 18, 2015

(65) Prior Publication Data

US 2016/0272135 A1    Sep. 22, 2016

(30) Foreign Application Priority Data

Mar. 19, 2015    (KR) .......................... 10-2015-0038434

(51) Int. Cl.
*B60R 16/037* (2006.01)
*G05B 15/02* (2006.01)

(52) U.S. Cl.
CPC ............ *B60R 16/037* (2013.01); *G05B 15/02* (2013.01)

(58) Field of Classification Search
CPC ..... B60R 16/037; G05B 15/02; G05D 1/0011
USPC .............................................................. 701/2
See application file for complete search history.

(56) References Cited

U.S. PATENT DOCUMENTS

| | | | | |
|---|---|---|---|---|
| 8,718,837 B2 * | 5/2014 | Wang | .................... | B25J 9/1689 382/209 |
| 9,183,372 B2 * | 11/2015 | Choi | ................... | H04L 63/0853 |
| 9,307,197 B2 * | 4/2016 | Kato | ...................... | H04N 7/152 |
| 9,324,379 B2 * | 4/2016 | Lee | ......................... | G11B 27/28 |
| 9,325,782 B2 * | 4/2016 | Choi | ..................... | H04W 4/046 |
| 9,349,124 B2 * | 5/2016 | DeWakar | ............. | G06Q 20/102 |
| 9,369,567 B2 * | 6/2016 | Yoon | ................. | H04M 1/72577 |

FOREIGN PATENT DOCUMENTS

| | | |
|---|---|---|
| JP | 2005-348037 | 12/2005 |
| JP | 2014-69598 | 4/2014 |
| KR | 10-2009-0089501 | 8/2009 |
| KR | 10-2012-0027696 | 3/2012 |
| KR | 10-2014-0033294 | 3/2014 |

OTHER PUBLICATIONS

Office Action for Korean Patent Application No. 10-2015-0038434, dated Mar. 17, 2016, 8 pgs.

* cited by examiner

*Primary Examiner* — McDieunel Marc
*Assistant Examiner* — James E Stroud
(74) *Attorney, Agent, or Firm* — Brinks Gilson & Lione

(57) ABSTRACT

A vehicle remote control system is capable of controlling an operation device that corresponds to an operation command when the operation command for an image transmitted from a user terminal is input in a remote terminal. The vehicle remote control system includes a user terminal for transmitting an image of an operation object of a vehicle to a remote terminal, the remote terminal displays an image transmitted from the user terminal and when an operation command for an operation device displayed on the image is input, the remote terminal transmits a control signal, which is to control an operation of the operation device corresponding to the input operation command, to the vehicle, and the vehicle controls a function of the operation device according to the control signal.

22 Claims, 9 Drawing Sheets

VEHICLE AND VEHICLE REMOTE CONTROL SYSTEM INCLUDING THE SAME

CROSS-REFERENCE TO RELATED APPLICATION(S)

This application claims the benefit of Korean Patent Application No. 10-2015-0038434, filed on Mar. 19, 2015 in the Korean Intellectual Property Office, the entirety of which is incorporated herein by reference.

BACKGROUND

1. Field

Embodiments of the present disclosure relate to a vehicle and a vehicle remote control system configured to control the vehicle remotely.

2. Description of Related Art

As vehicle technology has been developed, various technologies and functions have been applied to a vehicle. As the technologies and the functions that are applied to the vehicle have increased, a number of operation devices in the vehicle to activate those functions have also increased.

Since each of the various operation devices may operate differently from each other, it may take a certain time for a driver to easily operate the various operation devices.

When a driver drives a vehicle that they are not familiar with, the driver may experience difficulties in operating the operation device while also driving the vehicle.

SUMMARY

It is an aspect of the present disclosure to provide a vehicle remote control system configured to control an operation device in a vehicle in response to an operation command when an operation command for an image, which is transmitted from a user terminal, is input by a remote terminal.

Additional aspects of the present disclosure will be set forth in part in the description which follows and, in part, will be obvious from the description, or may be learned by practice of the present disclosure.

In accordance with one aspect of the present disclosure, a vehicle remote control system includes a user terminal configured to transmit an image of an operation object of a vehicle to a remote terminal. The remote terminal is configured to display an image transmitted from the user terminal, and when an operation command for an operation device displayed on the image is input, is configured to transmit to the vehicle a control signal that is configured to control an operation of the operation device corresponding to the input operation command. The vehicle remote control system further includes a vehicle configured to control a function of the operation device according to the control signal.

The remote terminal may include a display unit configured to display an image transmitted from the user terminal, and configured to receive an input of the operation command for the operation device as a pre-determined touch gesture.

The remote terminal may include an input unit configured to receive an input of the operation command for the operation device.

The input unit may include a voice recognition device configured to receive an input of the operation command in a voice manner or a motion recognition device configured to receive an input of the operation command in a motion manner.

The remote terminal may identify an operation command and an operation device corresponding to the input operation command when the operation command for the operation device is input, and may generate a control signal that is configured to remotely control a device of the vehicle configured to perform a function related to the identified operation device, according to the identified operation command.

The remote terminal may further include a communication unit configured to receive an image transmitted from the user terminal and configured to transmit the control signal to the user terminal.

The communication unit may perform a communication with the user terminal and the vehicle by using 3 generation communication technology, 4 generation communication technology or 5 generation communication technology.

The user terminal may include a camera configured to acquire an image and a communication unit configured to transmit the acquired image to the remote terminal.

The vehicle may include a communication unit configured to perform a communication with the remote terminal and a controller configured to control an operation of a device configured to perform a function related to the operation device according to the control signal transmitted from the remote terminal.

In another aspect of the present disclosure, an operation method of a vehicle remote control system includes transmitting an image of an operation object of a vehicle from a user terminal to a remote terminal, transmitting a control signal to control an operation of the operation device to the vehicle when an operation command for an operation device displayed on the image is input in the remote terminal, and controlling a function of the operation device according to the control signal in the vehicle.

The operation method may further include displaying an image, which is transmitted from the user terminal, on the remote terminal and receiving an input of an operation command for an operation device displayed on the image in the remote terminal.

The receiving of an input of an operation command may include receiving an input of an operation command for the operation device as a pre-determined touch gesture on a display unit of the remote terminal.

The receiving of an input of an operation command may include receiving an input of an operation command for the operation device via an input unit of the remote terminal.

The receiving of an input of an operation command may include receiving an input of an operation command in a voice or motion manner.

The transmission of the control signal to the vehicle may include identifying the input operation command and an operation device corresponding to the input operation command, in the remote terminal when an operation command for the operation device is input, and generating a control signal to remotely control a device of the vehicle configured to perform a function related to the identified operation device, according to the identified operation command.

The transmission of the control signal to the vehicle may include an operation in which the remote terminal transmits the control signal to the vehicle by using 3 generation communication technology, 4 generation communication technology or 5 generation communication technology.

The control of the function of the operation device may include controlling in the vehicle an operation of a device configured to perform a function related to the operation device according to a control signal transmitted from the remote terminal.

In a further aspect of the present disclosure, a vehicle includes a communication unit configured to receive a control signal of an operation device transmitted from a remote terminal, and a controller configured to control a function of the operation device according to the control signal transmitted from the remote terminal.

The controller may control an operation of a device configured to perform a function related to the operation device according to the control signal transmitted from the remote terminal.

In another aspect of the present disclosure, a control method of a vehicle includes receiving a control signal of an operation device transmitted from a remote terminal, in a communication unit of the vehicle, and controlling a function of the operation device according to a control signal transmitted from the remote terminal in a controller of the vehicle.

The control of function of the operation device may include controlling an operation of a device configured to perform a function related to the operation device according to the control signal transmitted from the remote terminal, in the controller.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Reference will now be made in detail to forms of the present disclosure, examples of which are illustrated in the accompanying drawings.

Figure 1:
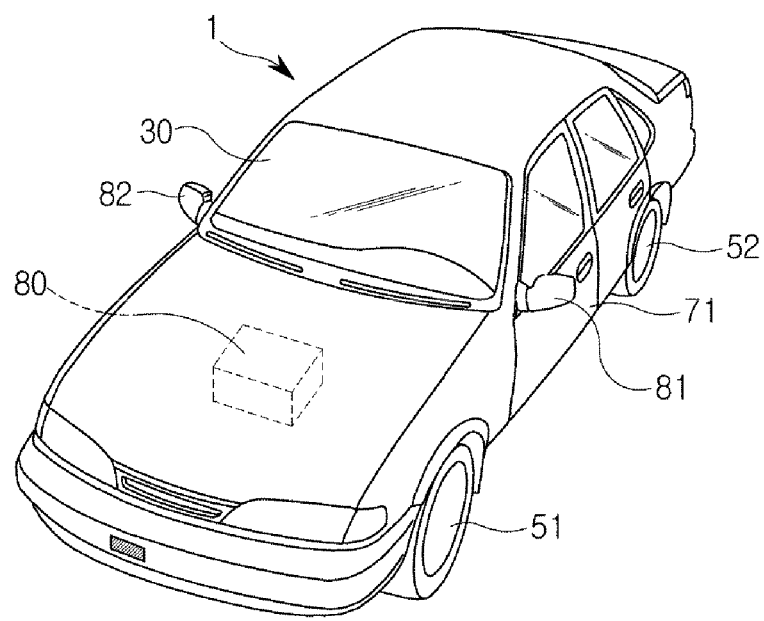
FIG. 1 is a view illustrating an exterior of a vehicle.
Figure 2:
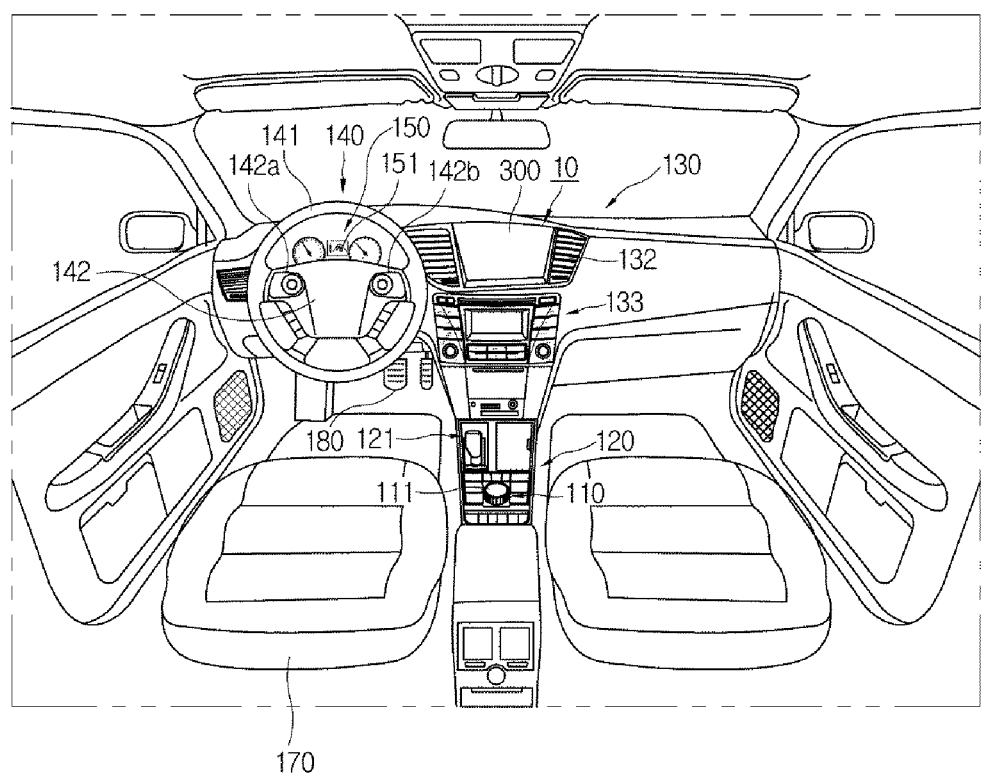
FIG. 2 is a view illustrating a configuration of an interior of a vehicle.

FIG. 1 is a view illustrating an exterior of a vehicle in accordance with one form of the present disclosure and FIG. 2 is a view illustrating a configuration of an interior of a vehicle.

Referring to FIG. 1, a vehicle 100 may include a body 1 forming an exterior of the vehicle 100, vehicle wheels 51 and 52 moving the vehicle 100, a driving device 80 rotating the vehicle wheels 51 and 52, a door 71 closing the inside of the vehicle 100 from the outside, a front glass 30 providing a front view of the vehicle 100 to a driver and side mirrors 81 and 82 providing a view of a rear side of the vehicle 100 to the driver.

The vehicle wheels 51 and 52 may include a front wheel 51 provided on the front of the vehicle 100 and a rear wheel 4 provided on the rear of the vehicle 100.

The driving device 80 may supply a torque to the front wheel 51 or the rear wheel 52 so that the vehicle 100 may be moved forward and backward. The driving device 80 may employ an engine configured to generate a torque by burning fossil fuel or a motor configured to generate a torque by receiving power source from a capacitor (not shown).

The door 71 may be rotatably provided on a right side and a left side of the body 1. When the door 71 is opened, a driver may be allowed to board on the vehicle 100, and the door 71 is closed, the inside of the vehicle 100 may be closed from the outside.

The front glass 30 referred to as "windshield glass" may be provided on an upper portion of the front of the vehicle 100. A driver inside the vehicle 100 may see in front of the vehicle 100.

The side mirrors 81 and 82 may include a left side mirror 81 provided on the left side of the body 1 and a right side mirror 82 provided on the right side of the body 1. A driver inside the vehicle 100 may check the status of the lateral side and the rear side of the vehicle 100 with eyes via the side mirrors 7 and 8.

In addition, the vehicle 100 may include a variety of sensors configured to help a driver to recognize conditions around the vehicle by detecting an obstacle around the vehicle. The vehicle 100 may include a variety of sensors configured to detect driving information of the vehicle, e.g., the speed of the vehicle.

Referring to FIG. 2, the vehicle 100 may include a dashboard in which a gear box 120, a center fascia 130, a steering wheel 140, and a gauge 150 are provided.

In the gear box 120, a gear lever 121 configured to change a speed of the vehicle 100 may be installed. As illustrated in drawings, in the gear box 120, an input device 110 provided with a dial operation unit 111 and a variety of buttons may be installed. The dial operation unit 111 and a variety of buttons may allow a driver to control a function of multimedia device including a navigator 10 and an audio device 133, or an operation of main function of the vehicle.

An air conditioning device 132, the audio device 133 and the navigator 10 may be installed in the center fascia 130.

The air conditioning device 132 may keep an air inside the vehicle 100 in fresh by controlling a temperature, a moisture, an air cleanliness, and a flow of air of the inside of the vehicle 100. The air conditioning device 132 may include at least one discharging port installed in the center fascia 130 to discharge air. A button or a dial may be installed in the center fascia 130 to control the air conditioning device 132. A user, such as a driver, may control the air conditioning device 132 by using a button disposed on the center fascia 130. By buttons or the dial operation unit 111 of the input device 110 installed in the gear box 120, the air conditioning device may be controlled.

In some forms, the navigator 10 may be installed in the center fascia 130. The navigator 10 may be embedded inside the center fascia 130 of the vehicle 100. In the center fascia 130 according to one embodiment, an input unit configured to control the navigator 10 may be installed. According to embodiment, the input unit of the navigator 10 may be installed in another position other than the center fascia. For example, the input unit of the navigator 10 may be formed around a display unit 300 of the navigator 10. Alternatively, the input unit of the navigator 10 may be installed in the gear box 120.

The steering wheel 140 may be a device configured to adjust a driving direction of the vehicle 100, and may include a rim 141 held by the driver and a spoke 142 connected to a steering system of the vehicle 100 and configured to connect the rim 141 to a hub of a rotation shaft for the steering. In some forms, operation devices 142a and 142b may be formed in the spoke 142 to control various devices inside the vehicle 100, such as an audio device. The steering wheel may perform a function of drawing driver's attention so that the driver drives the vehicle safe. For example, when the driver drives the vehicle while drowsy, the steering wheel may warn tactually the drowsy driving to the driver by vibration, and when an accident risk occurs according to the change in the driving condition, the steering wheel may also warn the risk by the vibration.

The dashboard may further include various gauge boards indicating a driving speed of the vehicle, and the number of engine rotation or fuel residual quantity. The gauge board may include a gauge display unit configured to display information related to the vehicle condition and the vehicle driving, and information related to operating multi-media device.

A driver may drive the vehicle by operating the above-mentioned various devices provided in the dashboard. As illustrated in FIG. 2, in the vehicle 100, a variety of operation devices 130 operated by the driver may be installed in the vehicle 100 to perform a variety of functions. As mentioned above, in the steering wheel, the gear box, and the center fascia, a variety of operation devices 130 needing a variety of operating method, e.g., button or dial operation unit may be provided. Since an operating method of the variety of operation device 130 is pre-determined according to a function to be executed, it may be difficult for a driver or a passenger who are not used to performing a pre-determined manipulation, to execute a desired function easily. Forms of a vehicle remote control system may allow a driver to more easily operate the operation device 130 thorough a user terminal 300 and a remoter terminal 500. Hereinafter forms of a vehicle remote control system will be described in detail.

Figure 3:
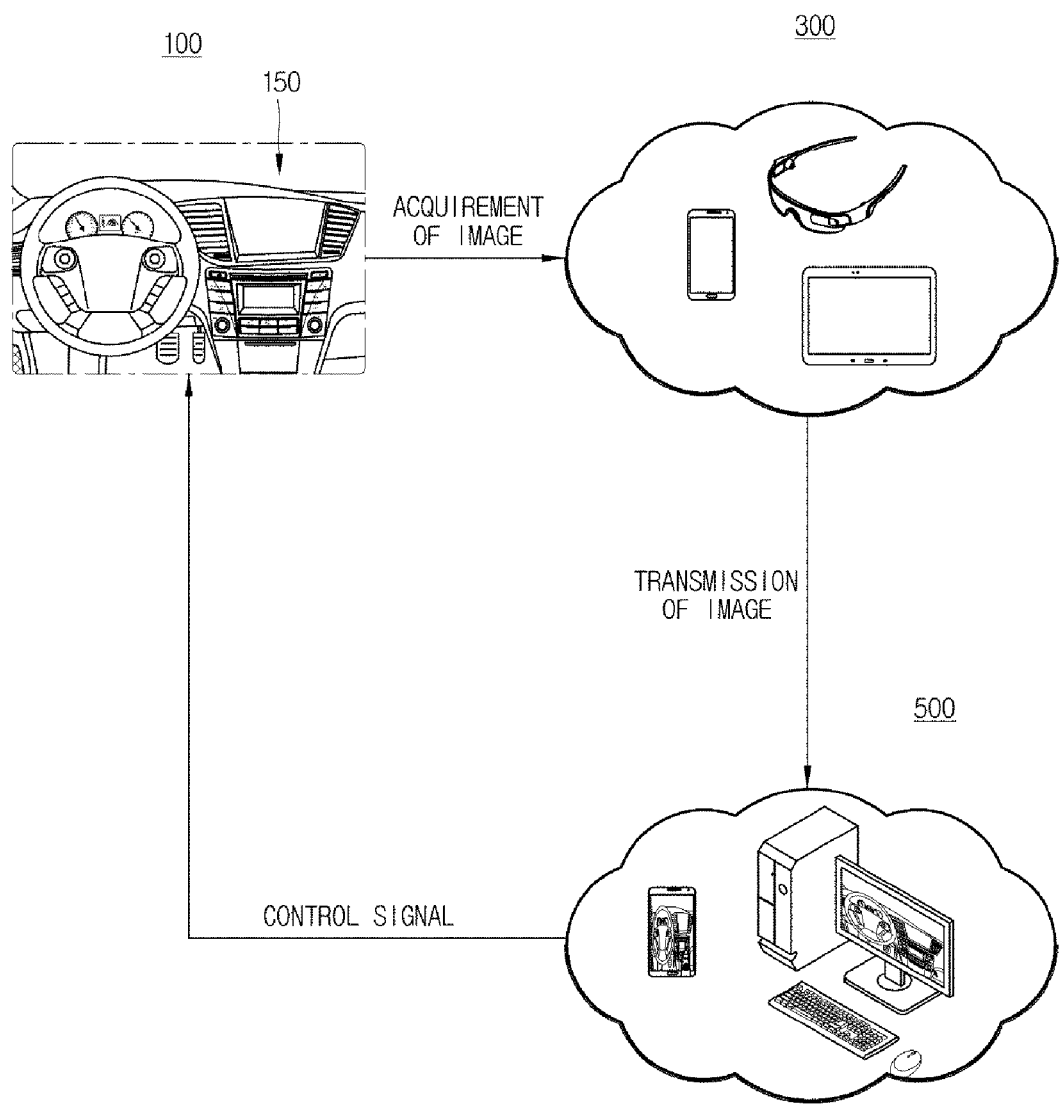
FIG. 3 is a view schematically illustrating a configuration of a vehicle remote control system.
Figure 4:
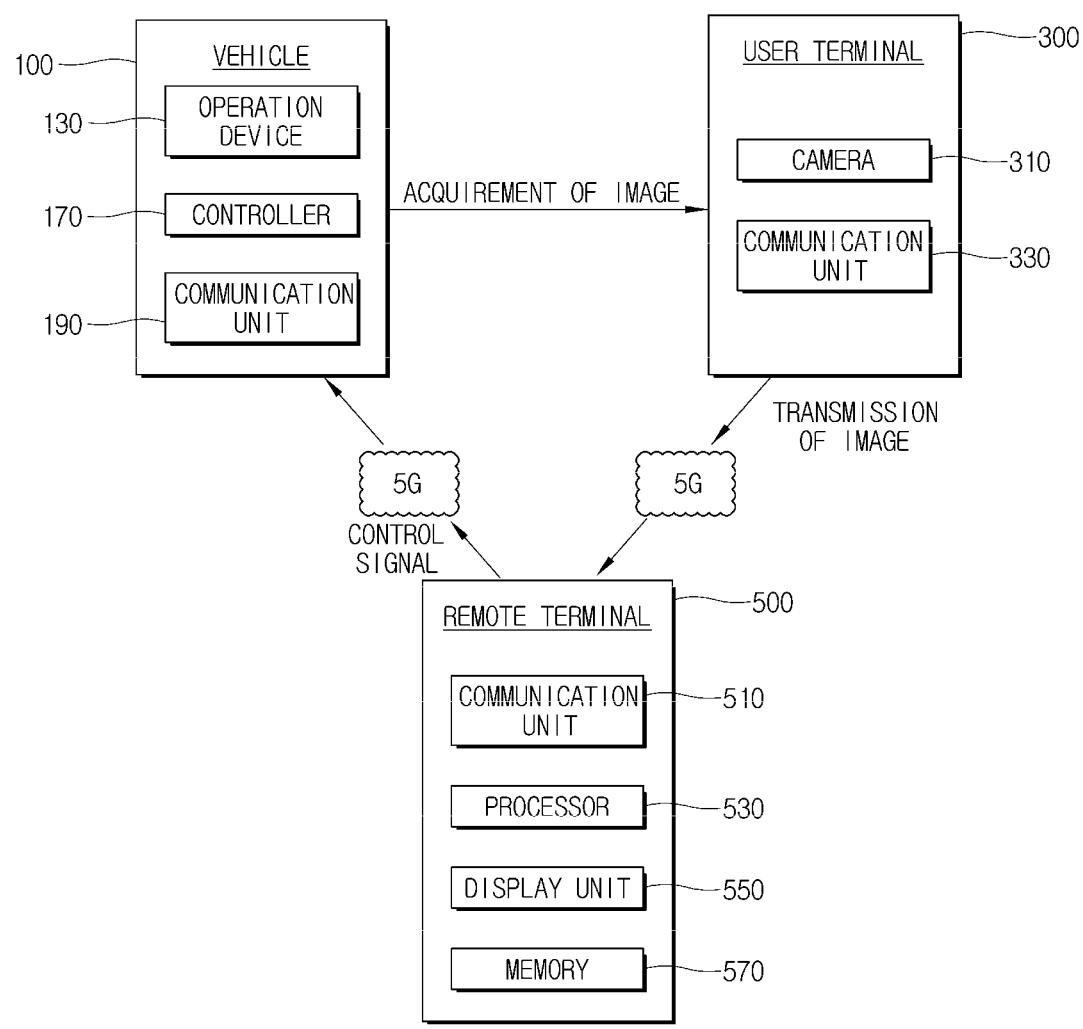
FIG. 4 is a block diagram illustrating a configuration of a vehicle remote control system.

FIG. 3 is a view schematically illustrating a configuration of a vehicle remote control system, and FIG. 4 is a block diagram illustrating a configuration of a vehicle remote control system.

As illustrated in FIGS. 3 and 4, a vehicle remote control system may include a user terminal 300 configured to acquire an image of the operation device 130 of the vehicle and configured to transmit the image to a remote terminal 500, the remote terminal 500 configured to display the image transmitted from the user terminal, and when an operation command for the displayed image is input, configured to transmit a control signal corresponding to the operation command to the vehicle, and a vehicle 100 configured to control an operation of the operation device 130 according to the control signal transmitted from the remote terminal 500.

As illustrated in FIGS. 3 and 4, the user terminal 300 may include a camera 310 configured to acquire the outside image, and a communication unit 330 configured to transmit the image acquired by the camera 310 to the remote terminal 500. The image acquired by the camera 310 may be a still image, e.g., a picture, or a video.

As illustrated in FIG. 3, the user terminal 300 may include a mobile terminal, e.g., a smart phone and a tablet computer, configured to support a camera function, a communication function, and a telephone function, and a wearable terminal formed in a glasses type or a watch type, configured to support a camera function and a communication function, but is not limited thereto.

FIG. 3 illustrates one example of the user terminal 300, and any terminal configured to include a camera function and a communication function may be included in the scope of the user terminal 300.

The user terminal 300 may include an image processor configured to convert an image acquired by the camera 310 into an image having a resolution, which is processable by the processor 530 of the remote terminal 500, or into a format which is processable by the processor 530 of the remote terminal 500.

The communication unit 330 may transmit an image acquired by the camera 310 or image data, which is converted by the image processor, to the remote terminal 500 via a communication network.

3 generation communication technology and 4 generation communication technology may be used as the communication network for the transmission of the data. In addition, 5 generation communication technology may be used as the communication network for faster transmission of the information, which is near real time. The communication unit 330 may be configured by a device capable of supporting 3G, 4G, and 5G communication technology. The communication unit 330 of the user terminal 300 and the communication unit 510 of the remote terminal 500, and the communication unit 510 of the remote terminal 500 and the communication unit 190 of the vehicle may transmit and receive information via a communication network using 5G communication technology for faster transmission of the information, which is near real time. Hereinafter 5G communication technology will be described in detail with reference to FIGS. 5 and 6A to 6C.

Figure 5:
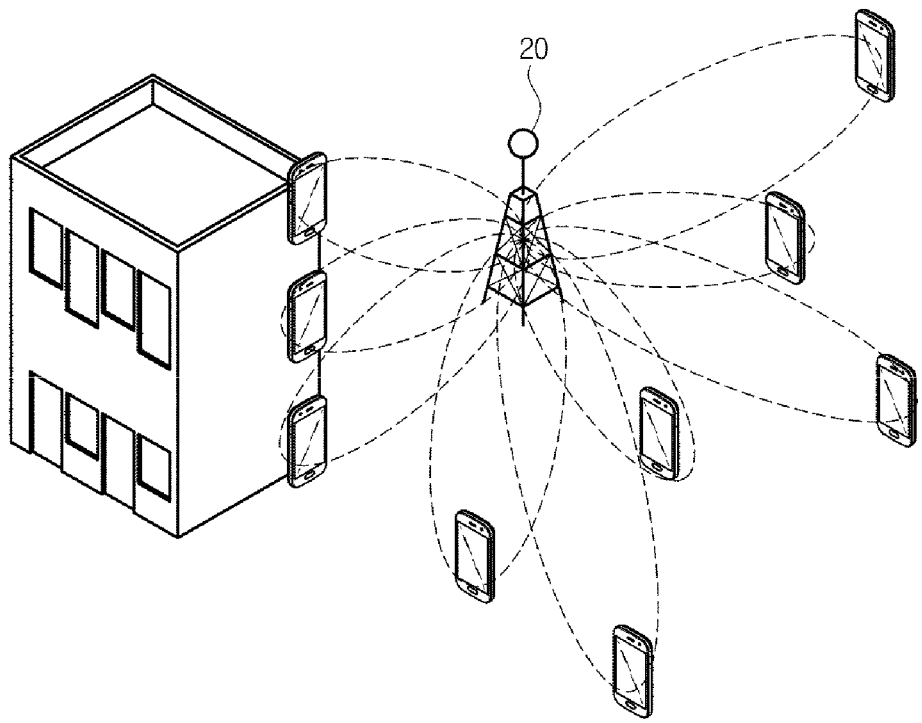
FIG. 5 is a view illustrating large scale antenna system of a base station according to 5 generation communication technology (5G communication technology)
Figure 6A:
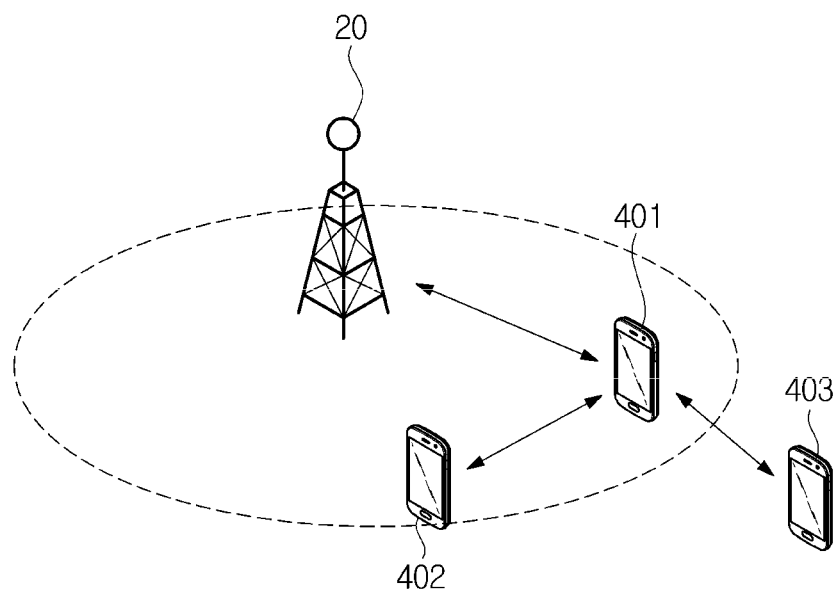
FIGS. 6A to 6C are views illustrating a network according to 5G communication technology.
Figure 6B:
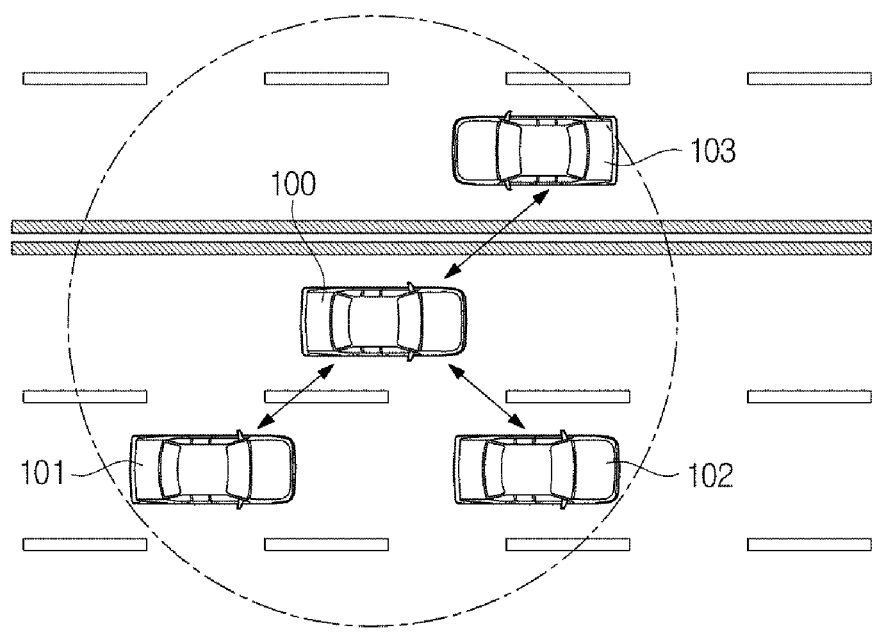
Figure 6C:
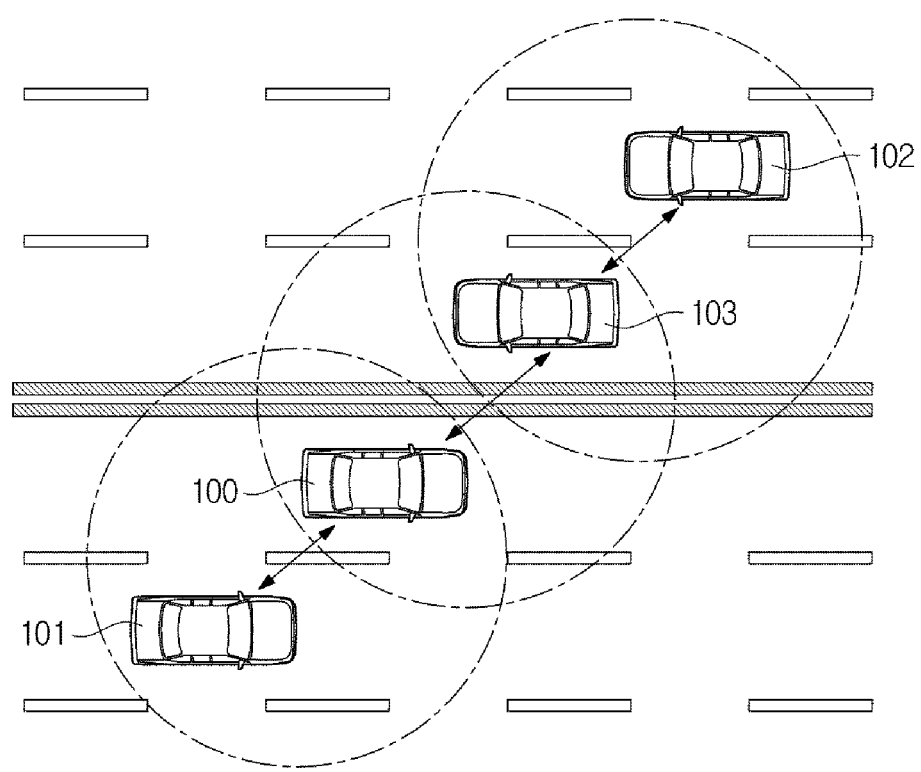

FIG. 5 is a view illustrating large scale antenna system of a base station according to 5G communication technology, and FIGS. 6A to 6C are views illustrating a network according to 5G communication.

As mentioned above, the communication unit 330 may transmit or receive a wireless signal to or from a device, e.g., a server, via a base station by using a communication technology, e.g., 3G and 4G. In addition, the communication unit 330 may transmit or receive a wireless signal including data to or from a terminal, which is placed within a certain range, by using a communication technology, e.g., Wireless LAN, Wi-Fi, Bluetooth, Zigbee, Wi-Fi Direct (WFD), Ultra wideband (UWB), Infrared Data Association (IrDA), Bluetooth Low Energy (BLE), and Near Field Communication (NFC).

In addition, the communication unit 330 may transmit or receive a wireless signal by using 5G, as mentioned above. 4G communication technology may uses a frequency band lower than 2 GHz, but 5G communication technology may use approximately frequency band of 28 GHz, but the frequency band of 5G communication technology is not limited thereto.

5G communication technology may employ large scale antenna system. Large scale antenna system may represent a system capable of covering up ultra-high frequency band by using several ten or more antennas and capable of transmitting and receiving large amounts of data simultaneously via multiple access. Particularly, large scale antenna system may allow radio waves to be transmitted and received further in a certain direction by adjusting the array of antenna elements and large scale antenna system may expand an area in which 5G network is used as well as large amount data may be transmitted.

Referring to FIG. 5, the base station 20 may simultaneously transmit and receive data to and from devices via the large scale antennal system. In addition, the large scale antennal system may minimize radio waves flowing in a direction other than a direction of transmitting radio wave so that a noise is reduced. Therefore, the transmission quality may be improved and the power consumption may be reduced.

In compassion with a conventional modulation of transmission signal by using Orthogonal Frequency Division Multiplexing (OFDM), 5G communication technology may transmit a wireless signal, which is converted by using Non-Orthogonal Multiplexing Access (NOMA). Thus, multi access of more devices and transmission and reception of large capacity may be performed at the same time.

For example, 5G communication technology may provide a transfer rate of up to 1 Gbps. 5G communication technology may support the immersive communication that requires large capacity transmission, e.g., Ultra-HD (UHD), 3D, and hologram, by the large capacity transmission. Thus, a user may more rapidly transmit or receive high-capacity data, which is more sophisticated and immersive, via 5G communication technology.

In addition, 5G communication technology may perform a real time process at maximum response speed less than 1 ms. Thus, a real time service, which is configured to react before a user recognizes, may be supported in 5G communication technology. For example, a vehicle may receive sensor information from a variety of devices while driving, and then provide a variety of remote controls as well as an autonomous system through the real time process. A vehicle may provide the possibility of collision by processing sensor information related to adjacent vehicles placed in the around of the vehicle, in real time. In addition, the vehicle may provide traffic information, which may occur on a driving path, to a user in real time.

By ultra-real time process and large capacity transmission provided by 5G communication technology, a vehicle may provide big data service to a passenger in the vehicle. For example, the vehicle may provide customized information, which is appropriate for the condition of the passenger in the vehicle, by analyzing a variety of Web information, and SNS information. In some forms, the vehicle may collect information relate to famous restaurants and sights, which are placed around the driving path, by big data mining, and then provide the information to the passenger in real time. Therefore, the passenger may check a variety of information related to region around the driving path in real time.

Meanwhile, 5G network may more subdivide a cell to support the large capacity transmission and to secure the high density of network. Herein, the cell may represent a division, which is subdivided into a small division from a wide area, to use a frequency efficiently in the mobile communication. At this time, small output base station may be installed in each cell so that a communication between terminals may be supported. For example, in 5G network, the size of cell may be reduced to be more subdivided, and thus two step-structure of macro cell base station-distributed small base station-communication terminal may be formed.

In addition, in 5G network, a wireless signal may be relay transmitted by multihop technology. For example, as illustrated in FIG. 6A, a first terminal 401 may relay transmit a wireless signal, which is intended to be transmitted by a third terminal 403 placed out of the network of a base station 400, to the base station 400. In addition, the first terminal 401 may relay transmit a wireless signal, which is intended to be transmitted by a second terminal 402 placed in the network of the base station 400, to the base station 400. As mentioned above, at least one of devices, which are capable of using 5G network, may perform the relay transmission by multihop technology, but is not limited thereto. Thus, an area in which 5G network is supported may be expended, and buffering may be relieved wherein the buffering may occur when a large number of users are present in a cell.

5G communication technology may support Device-to-Device (D2D) communication applied to a vehicle or wearable device. The D2D communication may be a communication configured to perform between devices, and may represent a communication configured to transmit and receive a wireless signal including a variety of data stored in a device as well as data detected by a device by using a sensor. As for the D2D communication, there may be no need of transmitting and receiving a wireless signal via a base station, and the transmission of wireless signal may be performed between devices, thereby reducing unnecessary energy consumption. In order that the vehicle and the wearable device use 5G communication technology, an antenna may be embedded therein. The vehicle 100 may transmit and receive a wireless signal to and from another vehicle placed around the vehicle 100 via the D2D communication. For example, as illustrated in FIG. 6B, the vehicle 100 may perform the D2D communication with other vehicles 101, 102, 103 placed around the vehicle 100. In addition, the vehicle 100 may perform the D2D communication with a traffic information device (not shown) installed in the junction.

For another example, as illustrated in FIG. 6C, the vehicle 100 may transmit and receive a wireless signal to and from a first vehicle 101 and a third vehicle 103 via the D2D communication, and the third vehicle 103 may transmit and receive data to and from the vehicle 100 and a second vehicle 102 via the D2D communication. That is, between a plurality of vehicles 100, 101, 102, 103, all of which are placed within a certain distance allowing the D2D communication, a virtual network may be formed and transmit and receive a wireless signal.

Meanwhile, 5G network may expand an area in which the D2D communication is supported, so that a device may perform the D2D communication with another device placed further away from the device. The real time process at a response speed less than 1 ms and the large capacity communication at a speed of up to 1 Gbps may be supported, and thus while driving, vehicles may transmit and receive a signal including desired data with each other.

For example, via 5G communication, while driving, a vehicle may access to another vehicle adjacent to the vehicle, a variety of servers, and a system, in real time, and may transmit and receive data. Therefore the vehicle may process the data to provide a variety of services, e.g., a path guide service via the augmented reality.

In addition, a vehicle may transmit and receive a wireless signal including data via a base station or the D2D communication by using a frequency band other than the above mentioned frequency band. It not limited to a communication technology by using the above-mentioned frequency band.

The remote terminal 500 may include a communication unit 510 configured to receive an image transmitted from the user terminal 300, a display unit 550 configured to display the image received by the communication unit 510, a processor 530 when an operation command for the operation device 130 displayed on the display unit 550 is input, configured to generate a control signal corresponding to the operation command, and configured to transmit the control signal to the vehicle via the communication unit 510, and a memory unit 570 configured to store information related to the operation device. The remote terminal 500 may be a mobile communication device, e.g., a smart phone and a tablet personal computer (PC), a computer, e.g., a laptop computer and a task top computer, and a server, which is provided to remote control the vehicle, but is not limited thereto. Any device configured to support communication function and display function, and configured to support processing function configured to generate a control signal corresponding to an operation command, may be included in the scope of the remote terminal 500 according to one embodiment.

As the same as the above mentioned communication unit 330 of the user terminal 300, the communication unit 510 of the remote terminal 500 may be configured with a device configured to support 3G, 4G, and 5G communication technology, which are employed by a communication network.

The display unit 550 may display an image, which is received by the communication unit 510, in real time. The display unit 550 may display information of the remote terminal 500 to correspond to a command input by a user of the remote terminal 500.

The display unit 550 may employ Light Emitting Diode (LED) self-emitting, Organic Light Emitting Diode (OLED) or Liquid Crystal Display (LCD) provided with an additional emitting source.

The display unit 550 may employ a Touch Screen Panel (TSP) configured to receive a control command from a user and configured to display operation information corresponding to the control command. The Touch Screen Panel (TSP) may include a display unit configured to display operation information and a control command input from a user, a touch panel configured to detect coordinates in which a part of user's body is contacted, and a touch screen controller configured to determine the control command input from a user, based on the contact coordinated detected by the touch panel. The touch screen controller may recognize the control command input from a user, by comparing touch coordinates of a user detected by the touch panel, with coordinates of the control command displayed on the display unit.

When an image acquired by the user terminal 300, that is an image about the operation device 130 of the inside of the vehicle is displayed on the display unit 550, a user may input a command about an operation device 130, which is intended to be controlled, among the operation device 130 displayed on the display unit 550, by a touch.

For example, when an image displayed on the display unit 550 is related to an audio system operation device 130, and when a user of the remote terminal 500 wants to operate a radio function among a variety of buttons of the audio system operation device 130 displayed on the image, the user may input a command for remote operation of the radio function, by touching a position of the display unit 550 corresponding to an operation button of the radio function. In this way, an operation command for a variety of the operation devices 130, which is displayed on an image on the display unit 550 of the remote terminal 500, may be input.

As mentioned above, an operation command for the operation device 130 of the vehicle may be transmitted from the remote terminal 500 to the vehicle. A user of the user terminal 300 may request an operation method of the operation device 130, which is needed to be operated, to a user of the remote terminal 500 in a way that the user of the user terminal 300 may transmit an image of the operation device 130, in which the user of the user terminal 300 does not know the operation method of thereof, to the user of the remote terminal 500. The request of operation method may be performed through the commercial communications, e.g., a call and a short message. The user of the remote terminal 500 may answer to the request of the user of the user terminal 300 by directly operating the operation device 130, as mentioned above, as well as through a call or a short message.

The user of the remote terminal 500 my input an operation command by touching the display unit 550, or through the input unit of the remote terminal 500. The input unit of the remote terminal 500 may include a keyboard, a mouse, a joy stick, a track ball, a voice recognition device or a motion recognition device. For example, as illustrated in FIG. 3, a user may put a cursor on a radio function operation button among the operation device 130 displayed on an image of the display unit 550, and then may click a mouse, thereby operating remotely the radio function of the vehicle. The above-mentioned touch input or the input via the input unit may be just one example of method of inputting an operation command for an image displayed on the display unit 550 of the remote terminal 500, and thus a variety of input methods may be employed.

When an operation command for an image displayed on the display unit 550 is input, the processor 530 may identify which operation device 130 is corresponding to a touch part or a click part on the image. That is, a signal input to the processor 530 by a touch or a click may only include information related to coordinates of touch part or click part on the display unit 550, but may not include a practical operation command for the operation device 130. Therefore, the processor 530 may estimate information of the operation device 130, which is an object of practical operation command, from a signal input by a touch or a click. That is, the processor 530 may determine which operation device 130 displayed on the image is corresponding to a touch position or a click position. In addition, the processor 530 may identify that an operation command that is input by a touch or a click means which kind of method is used to operate the operation device 120 while identifying the operation device 130. For example, in a state in which a touch or a click is input to the operation device 130 operable by different operations, e.g., an operation by a push and a rotation, when the input is a simple touch or a simple click, the processor 530 may determine that it is an operation by a push, and when a touch and drag or a click and drag is input, the processor 530 may determine that it is an operation by a rotation. When a touch and drag or a click and drag is input, the processor 530 may determine whether the input operation increases a certain function, e.g., the strength of volume or the strength of wind from an air conditioning device, or the input operation reduces the certain function, according to a direction of the drag. The processor 530 may use pre-stored information in the memory 570 to identify an operation command and the operation device 130 from a signal which is input via the processor 530 by a touch or a click, as mentioned above. In the memory 570, information related to the operation device 130 of the vehicle may be stored to be classified by the type of vehicle, and information related to an operation method of various operation device 130, e.g., a button or a rotation operation unit may be stored.

Information related to the operation device 130 stored in the memory 570 may include image information related to various operation device 130 classified by the type of vehicle so that the operation device 130 may be identified from an image of the operation device 130 transmitted from the user terminal. That is, the processor 530 may identify that the operation device 130 transmitted from the user terminal is included in which type of vehicle by comparing an image transmitted from the user terminal with an image of various operation device 130 stored in the memory. For the image comparison and the image matching, feature-based image Matching Algorithms may be used.

When the operation device 130 displayed on an image transmitted from the user terminal is identified, the processor 530 may determine an operation device 130 corresponding to coordinates information included in a signal, which is input by a touch or a click from an image transmitted from the user terminal and an image, which is matched in the memory 570.

When the operation device 130, which corresponds to an operation command input by a touch or a click, is determined, the processor 530 may identify an input operation command by comparing an operation command, which is input by a touch or a click, with an operation method of the determined operation device 130 stored in the memory 570.

As mentioned above, the processor 530 may analyze a signal input via the display unit 550 or the input unit, may identify an operation device 130, which is an object of the operation command, and an operation command about the corresponding operation device 130, and may generate a control signal for the operation device 130 based thereon.

When the processor 530 generates the control signal, the communication unit 510 may transmit the generated control signal to the vehicle. A communication between the communication unit 510 of the remote terminal 500 and the communication unit 190 of the vehicle may be performed via 3G, 4G, and 5G communication network, as the same as the above-mentioned communication between the user terminal 300 and the remote terminal 500. The communication between the communication unit 510 of the remote terminal 500 and the communication unit 190 of the vehicle may be performed via 5G communication network in order that inputting of the operation command of the remote terminal 500 and performing a certain function, which is performed by an operation of the operation device 130, in the real vehicle may be performed in real time. As mentioned above, 5G communication technology may perform a real time process at maximum response speed less than 1 ms, and may support a real time service.

When the communication unit 190 of the vehicle receives a control signal transmitted from the remote terminal 500, a controller 170 of the vehicle may control a device to be controlled according to the control signal transmitted from the remote terminal 500.

For example, when a control signal includes a command to turn on a radio in the audio system, the controller 170 may turn on the radio of the audio system. In addition, when a control signal includes a command to operate an air conditioner, the controller 170 may operate the air conditioner by driving a compressor of the air conditioning device. That is, when a control signal is received, the controller 170 may determine a device to be controlled, and perform an operation command input by a user of the remote terminal 500 by controlling the driving of the determined device.

According to another embodiment, a signal transmitted from the remote terminal 500 may be transmitted to the vehicle by passing through the user terminal 300 instead of directly transmitted to the vehicle. When the communication unit 190 of the vehicle supports only a short range communication, e.g., bluetooth, not 3G, 4G, or 5G communication technology, a control signal transmitted from the remote terminal 500 may be firstly transmitted to a user terminal 300 configured to support 3G, 4G, or 5G communication technology. A user terminal 300 receiving the control signal may transmit the control signal to the communication unit 190 of the vehicle by using the short range communication technology while being paired with the communication unit 190 of the vehicle.

In another form, a vehicle may include a camera (not shown) configured to record the inside of the vehicle and an eye tracker (not shown) configured to track driver's eyes. That is, the camera inside the vehicle may be linked with the eye tracker to record an operation device 130 in which the driver's eyes are placed, recognized by the eye tracker, and may transmit an image of the operation device 130 to the remote terminal 500 via the communication unit 190 of the vehicle. In this case, the communication unit 190 of the vehicle may support 3G, 4G, or 5G communication technology. The communication unit 190 of the vehicle may receive a control signal transmitted from the remote terminal 500, and the controller 170 may control driving a device to be controlled according to the received control signal, as mentioned above.

Figure 7:
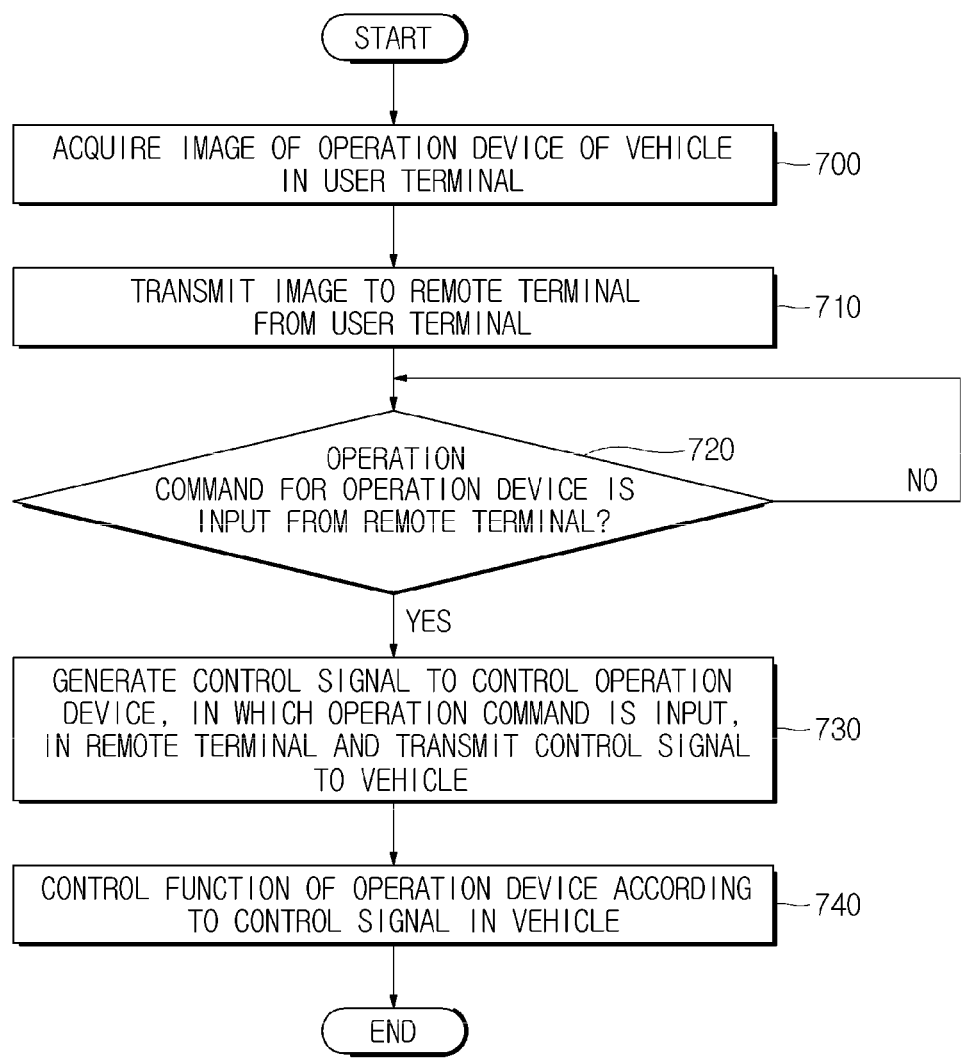
FIG. 7 is a control flowchart illustrating a control method of a vehicle remote control system.

FIG. 7 is a control flowchart illustrating a control method of a vehicle remote control system.

Referring to FIG. 7, a user terminal 300 may acquire an image of an operation device 130 of a vehicle (700), and may transmit the image to a remote terminal 500 (710). When an operation command for the operation device 130 is input to the remote terminal 500 (720), the remote terminal 500 may generate a control signal configured to control the operation device 130 which is an object of the operation command, and may transmit the control signal to the vehicle (730).

As illustrated in FIGS. 3 and 4, the user terminal 300 may include a camera 310 configured to acquire the outside image, and a communication unit 330 configured to transmit the image acquired by the camera 310 to the remote terminal 500. The image acquired by the camera 310 may be a still image, e.g., a picture, or a video.

The communication unit 330 may transmit an image acquired by the camera 310 or image data, which is converted by the image processor, to the remote terminal 500 via a communication network. 3G communication technology and 4G communication technology, both of which are conventional commercialized, may be used as the communication network for the transmission of the data. In addition, 5G communication technology may be used as the communication network for faster transmission of the information, which is near real time. The communication unit 330 may be configured by a device capable of supporting 3G, 4G, and 5G communication technology. The communication unit 330 of the user terminal 300 and the communication unit 510 of the remote terminal 500 may transmit and receive information via a communication network using 5G communication technology for faster transmission of the information, which is near real time.

As the same as the above mentioned communication unit 330 of the user terminal 300, the communication unit 510 of the remote terminal 500 may be configured with a device configured to support 3G, 4G, and 5G communication technology, which are employed by a communication network. The display unit 550 may display an image, which is received by the communication unit 510, in real time. The display unit 550 may display information of the remote terminal 500 to correspond to a command, which is input by a user of the remote terminal 500.

When an image acquired by the user terminal 300, which is an image about the operation device 130 of the inside of the vehicle is displayed on the display unit 550, a user may input a command about an operation device 130, which is to be controlled, among the operation device 130 displayed on the display unit 550, by a touch. For example, when an image displayed on the display unit 550 is related to an audio system operation device 130, and when a user of the remote terminal 500 wants to operate a radio function among a variety of buttons of the audio system operation device 130 displayed on the image, the user may input a command for remote operation of the radio function, by touching a position of the display unit 550 corresponding to an operation button of the radio function. In this way, an operation command of the operation device 130, which is displayed on an image on the display unit 550 of the remote terminal 500, may be input. The user of the remote terminal 500 my input an operation command by touching the display unit 550, or through the input unit of the remote terminal 500. The input unit of the remote terminal 500 may include a key board, a mouse, a joy stick, a track ball, a voice recognition device or a motion recognition device. For example, as illustrated in FIG. 3, a user may put a cursor on a radio function operation button among the operation device 130 displayed on an image on the display unit 550, and then may click a mouse, thereby operating remotely the radio function of the vehicle. The above mentioned touch input or the input via the input unit may be just one example of method of inputting an operation command for an image displayed on the display unit 550 of the remote terminal 500, and thus a variety of input methods may be employed.

When an operation command for an image displayed on the display unit 550 is input, the processor 530 may identify which operation device 130 is corresponding to a touch part or a click part on the image. That is, a signal input to the processor 530 by a touch or a click may only include information related to coordinates of touch part or click part on the display unit 550, but may not include a practical operation command for the operation device 130. Therefore, the processor 530 may estimate information of the operation device 130, which is an object of practical operation command, from a signal input by a touch or a click. That is, the processor 530 may determine which operation device 130 displayed on the image is corresponding to a touch position or a click position. In addition, the processor 530 may identify that an operation command that is input by a touch or a click means which kind of method is used to operate the operation device 120 while identifying the operation device 130.

For example, in a state in which a touch or a click is input to the operation device 130 operable by different operations, e.g., an operation by a push and a rotation, when the input is a simple touch or a simple click, the processor 530 may determine that it is an operation by a push, and when a touch and drag or a click and drag is input, the processor 530 may determine that it is an operation by a rotation.

When a touch and drag or a click and drag is input, the processor 530 may determine whether the input operation increases a certain function, e.g., the strength of volume or the strength of wind from an air conditioning device, or the input operation reduces the certain function, according to a direction of the drag. As mentioned above, the processor 530 may analyze a signal input via the display unit 550 or the input unit, may identify an operation device 130, which is an object of the operation command, and an operation command about the corresponding operation device 130, and may generate a control signal for the operation device 130 based thereon.

When the processor 530 generates the control signal, the communication unit 510 may transmit the generated control signal to the vehicle. A communication between the communication unit 510 of the remote terminal 500 and the communication unit 190 of the vehicle may be performed via 3G, 4G, and 5G communication network, as the same as the above-mentioned communication between the user terminal 300 and the remote terminal 500. The communication between the communication unit 510 of the remote terminal 500 and the communication unit 190 of the vehicle may be performed via 5G communication network in order that inputting of the operation command of the remote terminal 500 and performing a certain function, which is performed by an operation of the operation device 130, in the real vehicle may be performed in real time. As mentioned above, 5G communication technology may perform a real time process at maximum response speed less than 1 ms, and may support a real time service.

When the control signal is transmitted from the remote terminal 500, the vehicle may control a function of the operation device 130 according to the control signal (740).

When the communication unit 190 of the vehicle receives a control signal transmitted from the remote terminal 500, the controller 170 of the vehicle may control a device to be controlled according to the control signal transmitted from the remote terminal 500. For example, when a control signal includes a command to turn on a radio in the audio system, the controller 170 may turn on the radio of the audio system. In addition, when a control signal includes a command to operate an air conditioner, the controller 170 may operate the air conditioner by driving a compressor of the air conditioning device. That is, when a control signal is received, the controller 170 may determine a device to be controlled, and perform an operation command input by a user of the remote terminal 500 by controlling the driving of the determined device.

As is apparent from the above description, according to the proposed vehicle remote control system, a driver may easily operate an operation device having a complicated structure, which is strange for the driver, by a control and a description via a remote terminal.

Although a few forms of the present disclosure have been shown and described, it would be appreciated by those skilled in the art that changes may be made in these forms without departing from the principles and spirit of the disclosure, the scope of which is defined in the claims and their equivalents.

What is claimed is:
1. A vehicle remote control system comprising:
an operation device installed within a vehicle, the operation device including an input option for controlling a vehicle function of the vehicle;
a user terminal configured to:
control an image capture device of the user terminal to capture an image depicting the operation device; and
transmit the image to a remote terminal;
the remote terminal configured to:
receive the image from the user terminal;
display the image;
receive an operation command input corresponding to the input option depicted in the image; and
transmit a control signal to the vehicle, the control signal including instructions for controlling the vehicle function according to the operation command input; and
the vehicle configured to:
receive the control signal; and
control the vehicle function according to the control signal.

2. The vehicle remote control system of claim 1, wherein:
the remote terminal comprises a display unit configured to display the image transmitted from the user terminal, and configured to receive the operation command input as a pre-determined touch gesture.

3. The vehicle remote control system of claim 1, wherein:
the remote terminal comprises an input unit configured to receive the operation command input.

4. The vehicle remote control system of claim 3, wherein:
the input unit comprises a voice recognition device configured to receive the operation command input in a voice manner or a motion recognition device configured to receive the operation command input of the operation command in a motion manner.

5. The vehicle remote control system of claim 1, wherein:
the remote terminal is configured to identify the operation command input and to identify the input option included in the operation device corresponding to the operation command input when the operation command input is received, and configured to generate the control signal to remotely control the operation device.

6. The vehicle remote control system of claim 1, wherein:
the remote terminal further comprises a communication unit configured to receive the image transmitted from the user terminal and configured to transmit the control signal to the user terminal.

7. The vehicle remote control system of claim 6, wherein:
the communication unit performs a communication with the user terminal and the vehicle by using 3 generation communication technology, 4 generation communication technology or 5 generation communication technology.

8. The vehicle remote control system of claim 1, wherein:
the image capture device of the user terminal is a camera configured to acquire an acquired image and a communication unit configured to transmit the acquired image to the remote terminal.

9. The vehicle remote control system of claim 1, wherein:
the vehicle comprises a communication unit configured to perform a communication with the remote terminal and a controller configured to control an operation of a device configured to perform a function related to the operation device according to the control signal transmitted from the remote terminal.

10. An operation method of a vehicle remote control system comprising:
controlling an image capture device of a user terminal to capture an image depicting an operation device installed in a vehicle;
transmitting the image to a remote terminal;
receiving at the vehicle, from the remote terminal, a control signal including instructions for controlling a vehicle function according to an operation command input received at the remote terminal that corresponds to an input option included in the operation device depicted in the image; and
controlling the vehicle function according to the control signal in the vehicle.

11. The operation method of claim 10, further comprising:
displaying the image, which is transmitted from the user terminal, on the remote terminal; and
receiving the operation command input for the input option among a plurality of other input options included in the operation device depicted in the image.

12. The operation method of claim 11, wherein:
receiving the operation command input comprises receiving a pre-determined touch gesture on a display unit of the remote terminal.

13. The operation method of claim 11, wherein:
receiving the operation command input comprises receiving the operation command input via an input unit of the remote terminal.

14. The operation method of claim 11, wherein:
receiving the operation command input comprises receiving a voice or motion manner.

15. The operation method of claim 11, further comprising:
Identifying, by the remote terminal, the operation command input and the input option included in the operation device corresponding to the operation command input, when the operation command input is received by the remote terminal; and
generating the control signal to remotely control the operation device.

16. The operation method of claim 15, wherein:
identifying the operation device and the input operation command comprises comparing the image transmitted from the user terminal with pre-stored information related to available operation devices, and identifying the operation command input by matching the image with pre-stored information that describes the vehicle function of the identified operation device.

17. The operation method of claim 11, further comprising:
transmitting the control signal to the vehicle using 3 generation communication technology, 4 generation communication technology or 5 generation communication technology.

18. The operation method of claim 10, wherein:
controlling the vehicle function comprises controlling in the vehicle an operation of a device in communication with the operation device according to the control signal.

19. A vehicle comprising:
an operation device including a plurality of input options for controlling a plurality of respective vehicle functions;
an image capture device configured to capture an image depicting the operation device;
a communication unit configured to:
transmit the image to a remote terminal; and
receive, from the remote terminal, a control signal including instructions for controlling a vehicle function according to an operation command input received at the remote terminal that corresponds to an input option included in the operation device depicted in the image; and
a controller configured to control the vehicle function according to the control signal.

20. A control method of a vehicle comprising:
receiving, by a communication unit of the vehicle, including instructions for controlling a vehicle function according to an operation command input received at the remote terminal that corresponds to an input option included in the operation device depicted in an image captured by an image capture device of a user terminal; and
controlling, by a controller of the vehicle, the vehicle function according to the control signal.

21. The control method of claim 20, wherein:
controlling the vehicle function comprises controlling, by the controller, an operation of a device configured to perform the vehicle function related to the operation device according to the control signal.

22. The control method of claim 20 further comprising: transmitting the image from the user terminal to the remote terminal.

\* \* \* \* \*